June 2, 1970  E. KUHNLE ETAL  3,515,231

PRICE-INDICATING WEIGHING SCALE

Filed Dec. 7, 1967  2 Sheets-Sheet 1

*Inventors:*
*Ernst KUHNLE*
*Josef SCHWARZ*
by: *Arthur O. Klein*
*their Attorney*

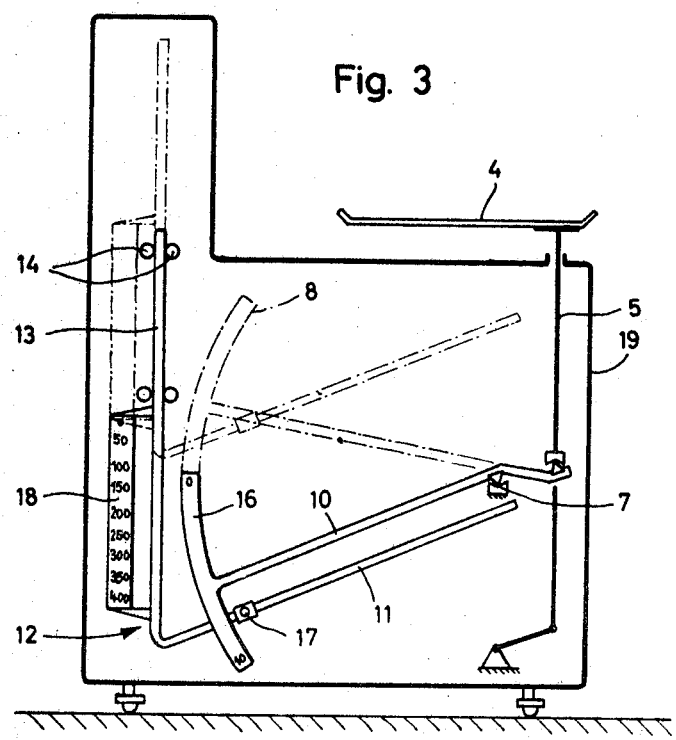
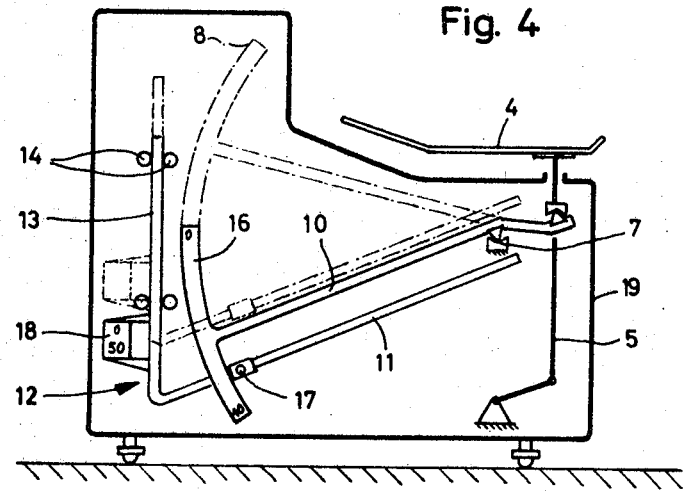

United States Patent Office 3,515,231
Patented June 2, 1970

---

3,515,231
PRICE-INDICATING WEIGHING SCALE
Ernst Kuhnle and Josef Schwarz, Balingen, Wurttemberg, Germany, assignors to Bizerba-Werke Wilhelm Kraut KG, Balingen-Wurttemberg, Germany, a firm
Filed Dec. 7, 1967, Ser. No. 688,933
Claims priority, application Germany, Dec. 7, 1966, B 90,184
Int. Cl. G01g 23/22
U.S. Cl. 177—34          7 Claims

ABSTRACT OF THE DISCLOSURE

A weighing scale for indicating the price of a load carried and weighed thereby. The scale is capable of weighing a load through a given range up to a predetermined maximum weight, and a price indicator is provided for indicating the price of loads of relatively low price per unit of weight throughout the entire range of weights which can be weighed by the scale. However, for loads which have a relatively high price per unit of weight, the price indicator indicates only a fraction of the possible total weight range at the region of the lower part of this weight range, so that the price indicator does not carry indications for relatively large weights of loads which have a high price per unit of weight. In this way the price indicator can be of reduced size enabling not only the simplification of the price indicator itself, but also enabling the housing of the scale to be made of a reduced size.

Background of the invention

The present invention relates to weighing scales.

In particular, the present invention relates to that type of weighing scale which is capable of indicating the price of a load which is weighed by the scale.

The invention relates in particular to scales of this type which are capable of being adjusted according to a given price per unit of weight, and which have within the housing of the scale a weighing mechanism carrying a price indicator which has graduations for indicating the total price of a given weight, which has a given price per unit of weight.

Known weighing scales of the above general type are provided with a price indicator of the configuration of sector of a circle which carries graduations indicating the various prices for the various weights according to a given price per unit of weight.

Price indicators of this general type which have a sector-shaped configuration forming part of a circle are supported for swinging movement about an axis which extends through the center of the circle of which the indicator forms a part, and starting from its turning axis the indicator has a plurality of arcuate rows of price graduations thereon, with each row indicating the prices for a given price per unit of weight. Thus, each of the arcuate rows, all of which extend along circles which have a common center in the turning axis of the indicator, is provided for a predetermined price per unit of weight and includes total price values wherein each price value indicates the product of the price per unit of weight multiplied by the particular weight.

The higher the price per unit of weight, the greater the number of price graduations which must be included in a given row. Thus, for example, if a load of 4 kg. is placed on the scale and has a unit price of 2 German marks per kg., for example, then the indicator will indicate a total price of 8 German marks. On the other hand, 4 kg. of a load which has a higher price per unit of weight, such as a price of 20 German marks per kg., will require a total price of 80 German marks. Thus, the latter price per unit of weight of 20 German marks per kg. must have many more graduations than the row for the lower price per unit of weight which is on the order of 2 German marks per kg., for example. It is apparent that a relatively long row of price graduations for a large number of individual price values requires a relatively large amount of space and makes it essential to provide a bulky scale housing.

Summary of the invention

It is accordingly a primary object of the present invention to provide a weighing scale which can be of a smaller size than conventional weighing scales.

In particular, it is an object of the invention to provide a weighing scale with a price indicator which is smaller than conventional price indicators.

Also, it is an object of the invention to provide a weighing scale which has a housing which is smaller than a conventional housing for a scale of comparable size, so that it becomes possible with the invention to save space and to provide a more compact structure.

The present invention is based upon the fact that in actual practice it is only under the rarest circumstances that a large amount of goods which have a high price per unit of weight is purchased. The present invention makes use of this fact.

Thus, the objects of the invention include the provision of a price-indicating weighing scale, which, without limiting the weight range, can nevertheless have a housing which is smaller than would otherwise be possible.

In accordance with the invention, the above objects are achieved by providing for the weighing scale a price indicator which has a substantially full range of prices up to the maximum weight which can be handled by the scale for loads of a relatively small price per unit of weight while having for loads of the relatively high price per unit of weight only prices for the lower fraction of the entire weight range which can be handled by the scale, so that in this way the price indicator of the scale can be made smaller and thus the housing of the scale also can be made smaller.

Brief description of the drawings

The present invention is illustrated by way of example in the accompanying drawings which form a part of this application, and in which:

FIG. 3 is a schematic representation of another type of known weighing scale; and FIG. 4 shows a weighing scale according to the invention of the same type as that of FIG. 3 but provided with the structure of the invention.

Description of preferred embodiments

Figure 1:
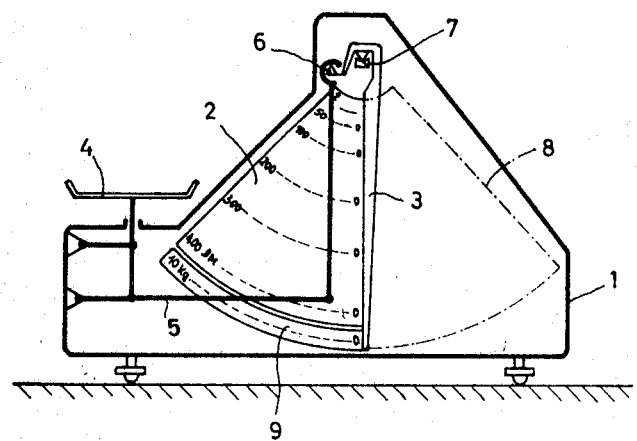
FIG. 1 is a schematic representation of a known weighing scale having a price indicator.
Figure 2:
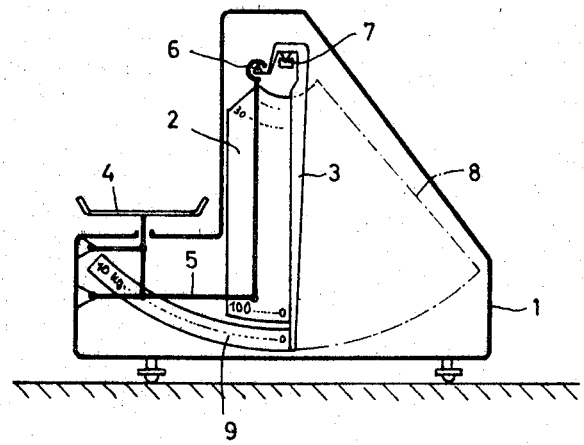
FIG. 2 shows a weighing scale of the same type as that illustrated in FIG. 1 but provided with the structure of the invention.

FIGS. 1 and 2 show weighing scales having weight and price graduations carried on suitable indicators. Within the housing 1 of the schematically illustrated weighing scale of FIG. 1, there is a price indicator 2 indicating prices of various weights of material according to the price per unit of weight. The indicator 2 is carried by the weighing beam of lever 3 for swinging movement therewith. A pan 4 is provided to receive the load, and through a weighing linkage 5, such as the illustrated parallelogram linkage, a pull is exerted on the knife edge 6 of the weighing mechanism. This downward pull resulting from a load placed on the pan 4 will result in swinging of the weighing lever 3 about the axis 7, also provided by way of a knife-edge structure. The maximum displacement of the beam 3 is indicated by the dot-dash line 8. The indicator 2 is fixed with an arcuate scale 9, which carries only weight graduations extending, for example, from 0 up to a maximum weight of 10 kg., which can be accommodated by the particular scale which is illustrated. The price indicator 2 of FIG. 1 is provided, as was referred to above, with a plurality of rows of price graduations, wherein each row is provided for a given price per unit of weight, with the rows for the higher prices of unit of weight being situated at a greater distance from the axis 7 than the rows for the lower prices per unit of weight.

Referring to FIGS. 3 and 4, the weighing scale structure illustrated therein includes a follower system for scanning the position of a tiltable weighing member, this follower system being connected with the price indicator. When a load is placed on the pan 4 of FIGS. 3 and 4, the linkage 5 will tilt the extension 10 around the knife-edge axis 7 so that the extension 10 assumes an angular position, determined by the weight of the load which is carried by the pan 4. By way of a known mechanism, which is not further described, the extension 10, when it assumes the position determined by the load, is blocked at its final position, and this extension 10 carried at one end of the scale of weights 16, which also may have a range of up to a maximum weight of 10 kg.

A known follower mechanism, which includes an angled member 12, guided for movement by rollers 14, and having arms 11 and 13, is shifted until a scanning pin 17 carried by the arm 11, and shiftable therealong to be located at a given position thereon, engages and is stopped by the extension 10, which has reached the predetermined angular position in accordance with the weight of the load on the pan 4.

The scanning pin 17 has been initially shifted along the arm 11 to a location thereon, determined by the particular price per unit of weight of the load which has been placed on the pan 4. As a result where the load has a low price per unit of weight, there will be a relatively short scanning movement of the follower mechanism 12, while with a load which has a high price per unit of weight, there will be a longer path of scanning movement. As a result, the price indicator 18, which carries the price indications, and which is fixed to the arm 13 of the mechanism 12, must be shifted through a greater or lesser distance corresponding to the price per unit of weight which has been set into the scale by proper location of the scanning pin 17 on the arm 11. In this way, the final price of the load can be indicated by an optical projecting system, for example.

The known structure, which is schematically illustrated in FIG. 1, and which includes the sector-shaped indicator 2, which has the configuration of part of a circle, can be made smaller to provide the structure of FIG. 3, according to which the price indicator 2 has been made smaller and has a substantially rectangular configuration. This is brought about by removing from the price indicator 2 the higher price values corresponding to larger weights of loads which have a high price per unit of weight. For example, in FIG. 1, the highest price for the outermost row of price graduations, which has a maximum price of 400 German marks, has been reduced, in the case of FIG. 2, to a maximum price indication of 100 German marks, so that only the lower fourth of the possible weighing range of the scale is utilized for the goods which have the highest price per unit of weight. In the same way, the adjoining rows which indicate relatively high prices per unit of weight are shortened, while the rows nearest to the turning axis of the indicator 2 and having the lowest prices per unit of weight are maintained substantially unchanged. Thus, it becomes possible not only to reduce the size of the price indicator 2 but also to reduce the size of the housing 1, as is apparent from a comparison of FIGS. 1 and 2.

With the embodiment of FIG. 4, the vertically extending price indicator 18, which has the price graduations thereon, has been correspondingly shortened to a considerable extent.

Thus, this indicator 18 has been shortened by eliminating therefrom the higher prices for the larger weights of loads which have the high costs per unit of weight, and in this way not only can the indicator 18 be made smaller, but also the entire housing can be made smaller, as is apparent from a comparison of FIGS. 3 and 4.

The smaller size of the indicators 2 and 18, which can be achieved with the invention, thus makes it possible to make the housing 1 and 19 smaller, not only with respect to their height, but also with respect to their depth from front to rear. These factors are of particular significance when the scale is to be mounted at a location where only little space is available. Moreover, as apparent from FIG. 4, it is possible with this construction to situate the load-carrying pan at a lower elevation, so that it is more easily visible, not only to the advantage of the seller, but also to the advantage of the purchaser to the same extent. Finally, the smaller price indicators of the invention require less work in connection with printing of the graduations on the indicators, or situating these graduations thereon in any other manner.

What is claimed is:

1. In a weighing scale for weighing loads which have different costs per unit of weight over a given possible total weight range up to a predetermined maximum weight, a price indicator operatively mounted in said scale and carrying price graduations indicative of the total cost of given loads at different prices per unit of weight over a portion of said weight range, said indicator carrying a substantially full weight range of price indications for loads of relatively low cost per unit of weight, and for loads for relatively high cost per unit of weight only graduations indicating the price for a fraction of said possible total weight range in the lower region of said weight range, so that the higher costs for relatively large weights of loads, which have a relatively high cost per unit of weight, are not included in the indicator, thus enabling the size thereof to be reduced, and weighing means operatively mounted in said scale and adapted to cooperate with weight indicating means over said total possible weight range, said weighing means and price indicator adapted to cooperate with each other to produce said price indications.

2. The combination of claim 1 and wherein a housing encloses said indicator and has a size which is substantially only great enough to accommodate the price indicator and the required movement thereof, so that the housing of the weighing scale can itself be made smaller than would be required to accommodate a price indicator carrying a full range of prices for loads of the more expensive price per unit of weight throughout the entire range of loads which can be weighed.

3. The combination of claim 2 and wherein said indicator is swingable about a given axis and is of a substantially rectangular configuration.

4. The combination of claim 2 and wherein said indicator is of a substantially vertical configuration and moves vertically within said housing.

5. The combination of claim 2 and wherein said weighing means include a scale of weights which is movably mounted within said housing.

6. The combination of claim 5 and wherein said scale of weights is connected to said price indicator for movement therewith.

7. The combination of claim 5 and wherein said scale of weights is carried by an extension of a weighing beam in said housing, and a follow-up mechanism carrying said indicator and following the extension which carries said scale of weights to indicate the total price of a load.

References Cited
UNITED STATES PATENTS

| | | | |
|---|---|---|---|
| 900,896 | 10/1908 | Templeton | 177—216 |
| 1,490,672 | 4/1924 | McQueen | 177—34 |

RICHARD B. WILKINSON, Primary Examiner

G. H. MILLER Jr., Assistant Examiner

U.S. Cl. X.R.

117—216